(12) United States Patent
Swanepoel

(10) Patent No.: US 6,836,925 B1
(45) Date of Patent: Jan. 4, 2005

(54) WINDSCREEN WIPER

(75) Inventor: Adriaan Retief Swanepoel, Pretoria (ZA)

(73) Assignee: Trico Products Corporation, Rochester Hills, MI (US)

( * ) Notice: Subject to any disclaimer, the term of this patent is extended or adjusted under 35 U.S.C. 154(b) by 0 days.

(21) Appl. No.: 09/806,807

(22) PCT Filed: Sep. 22, 1999

(86) PCT No.: PCT/IB99/01568
§ 371 (c)(1),
(2), (4) Date: Jun. 25, 2001

(87) PCT Pub. No.: WO00/21809
PCT Pub. Date: Apr. 20, 2000

(30) Foreign Application Priority Data

Oct. 9, 1998 (ZA) .............................. 98/9243

(51) Int. Cl.$^7$ ................................................. B60S 1/38
(52) U.S. Cl. ............................ 15/250.361; 15/250.48; 15/250.43; 15/250.451
(58) Field of Search ........................ 15/250.43, 250.44, 15/250.451, 250.452, 250.453, 250.454, 250.361, 250.48

(56) References Cited

U.S. PATENT DOCUMENTS

| | | | |
|---|---|---|---|
| 2,589,339 A | 3/1952 | Carson | 15/245 |
| 2,801,436 A | 8/1957 | Scinta | 15/245 |
| 3,029,460 A | 4/1962 | Hoyler | |
| 3,104,412 A | 9/1963 | Hinder | 15/250.42 |
| 3,132,367 A | 5/1964 | Wise | 15/250.42 |
| 3,192,551 A | 7/1965 | Appel | 15/250.36 |
| 3,480,986 A | 12/1969 | Forster | 15/250.36 |
| 3,588,942 A | 6/1971 | Schlesinger | 15/250.32 |
| 3,751,754 A | 8/1973 | Quinian et al. | 15/250.32 |
| 3,780,395 A | 12/1973 | Quinian et al. | 15/250.36 |
| 3,785,002 A | 1/1974 | Quinlan et al. | 15/250.36 |
| 3,872,537 A | 3/1975 | Bianchi | 15/250.42 |
| 3,881,214 A | 5/1975 | Palu | 15/250.42 |
| 4,028,770 A | 6/1977 | Appel | 15/250.42 |
| 4,063,328 A | 12/1977 | Arman | 15/250.42 |
| 4,102,003 A | 7/1978 | Hancu | 15/250.42 |
| 4,127,916 A | 12/1978 | van den Berg et al. | 15/250.42 |
| 4,339,839 A | 7/1982 | Knights | 15/250.04 |
| 4,343,063 A | 8/1982 | Batt | 15/250.42 |
| 4,587,686 A | 5/1986 | Thompson | 15/250.42 |
| 4,807,326 A | 2/1989 | Arai et al. | 15/250.42 |
| 5,325,564 A | 7/1994 | Swanepoel | 15/250.42 |
| 5,485,650 A | 1/1996 | Swanepoel | 15/250.43 |

FOREIGN PATENT DOCUMENTS

| | | |
|---|---|---|
| DE | 2 311 293 | 9/1974 |
| DE | 23 36 271 | 2/1975 |
| DE | 23 50 302 | 4/1975 |
| DE | 23 53 368 | 5/1975 |
| DE | 197 34 843 A1 | 2/1999 |
| DE | 198 14 609 A1 | 10/1999 |
| FR | 82 14233 | 8/1982 |
| GB | 1 012 902 | 12/1965 |
| GB | 1 395 918 | 5/1975 |
| GB | 2 308 542 A | 7/1997 |

*Primary Examiner*—Robert J. Warden, Sr.
*Assistant Examiner*—S Balsis
(74) *Attorney, Agent, or Firm*—Bliss McGlynn, P.C.

(57) ABSTRACT

A windscreen wiper includes an elongate curved backbone which is of a resiliently flexible material having a Young's modulus of between 50 to 350 GPa. The backbone has a substantially spatially consolidated cross-sectional profile at substantially all points along its length, and the magnitude of the width at substantially the widest point along the backbone, $W_m$ (expressed in millimeters) is at most $(-8.89 \cdot 10^{-5} * E + 0.05378) * L - 5.25$, where L is the total length of the backbone expressed in millimeters and E is the Young's modulus of the backbone material expressed in GPa. The invention also provides a relationship between the thickness and the length of the backbone.

15 Claims, 4 Drawing Sheets

WINDSCREEN WIPER

BACKGROUND OF THE INVENTION

1. Field of the Invention

This invention relates to a windscreen wiper, which is also known as a windshield wiper.

2. Description of the Related Art

The invention relates in particular to a windscreen wiper which has a curved backbone and which may have a varying width and/or thickness. It will be appreciated by those skilled in the art that the backbone may be in the form of a beam that is curved in a plane or may have a compound curvature such as in EP-A-0528 643 and DE-A-196 51229. The beam will have width and thickness dimensions. The beam will also have a radius of curvature at each point along its length.

The applicant has conducted substantial analysis and experimentation and believes that he has found a relationship between the width, the beam material's Young's modulus and the total length of the beam and the thickness, the beam material's Young's modulus and the total length, which provides a windscreen wiper that operates in an improved manner.

In this specification, the term "spatially consolidated" is to be understood, unless the context clearly indicates otherwise, to mean that the actual perimeters of a cross-section coincides with the shortest possible perimeter encapsulating that cross-section.

According to a first aspect of the invention there is provided a windscreen wiper which includes an elongate curved backbone which is of a resiliently flexible material having a Young's modulus of between 50 to 350 GPa, the backbone having a substantially spatially consolidated cross-sectional profile at substantially all points along its length, in which the magnitude of the width at substantially the widest point along the backbone, $W_m$ (expressed in millimeters) is at most $(-8.889.10^{-5}*E+0.05378)*L-5.25$, where L is the total length of the backbone expressed in millimeters and E is the Young's modulus of the backbone material expressed in GPa.

Further according to this aspect, there is provided a windscreen wiper which includes an elongate curved backbone which is of a resiliently flexible material having a Young's modulus of between 50 to 350 GPa, the backbone having a substantially spatially consolidated cross-sectional profile at substantially all points along its length, in which the ratio of the magnitude of the width at substantially the widest point along the backbone, to the total length L of the backbone, $R_w$ is at most $(-8.889.10^{-5}*E+0.05378)-5.25/L$, where L is the total length of the backbone expressed in millimeters and E is the Young's modulus of the backbone material expressed in GPa.

According to a second aspect of the invention there is provided a windscreen wiper which includes an elongate curved backbone which is of a resiliently flexible material having a Young's modulus of between 50 to 350 GPa, the backbone having a substantially spatially consolidated cross-sectional profile at substantially all points along its length, in which the magnitude of the thickness at substantially the thickest point along the backbone, $T_m$ (expressed in millimeters) is at most $0.0007*L-0.0027407*E+1.37814$, where L is the total length of the backbone expressed in millimeters and E is the Young's modulus of the backbone material expressed in GPa.

Further according to this aspect, there is provided a windscreen wiper which includes an elongate curved backbone which is of a resiliently flexible material having a Young's modulus of between 50 to 350 GPa, the backbone having a substantially spatially consolidated cross-sectional profile at substantially all points along its length, in which the ratio of the magnitude of the thickness at substantially the thickest point along the backbone to the total length L of the backbone, $R_t$ is at most $0.0007-(0.0027407*E-1.37814)/L$, where L is the total length of the backbone expressed in millimeters and E is the Young's modulus of the backbone material expressed in GPa.

The material of the backbone may be a composite material. In this case, the Young's modulus will be that of the composite material.

The total length of the backbone may be between about 300 mm to 1200 mm.

The backbone may have a varying width and or thickness, along its length. The backbone may have a free form curvature in a plane or may have a compound curvature (that is, curved in two planes).

BRIEF DESCRIPTION OF THE DRAWINGS

The invention is now described, by way of example with reference to the accompanying drawings, in which.

DETAILED DESCRIPTION OF THE PREFERRED EMBODIMENTS

Figure 1:
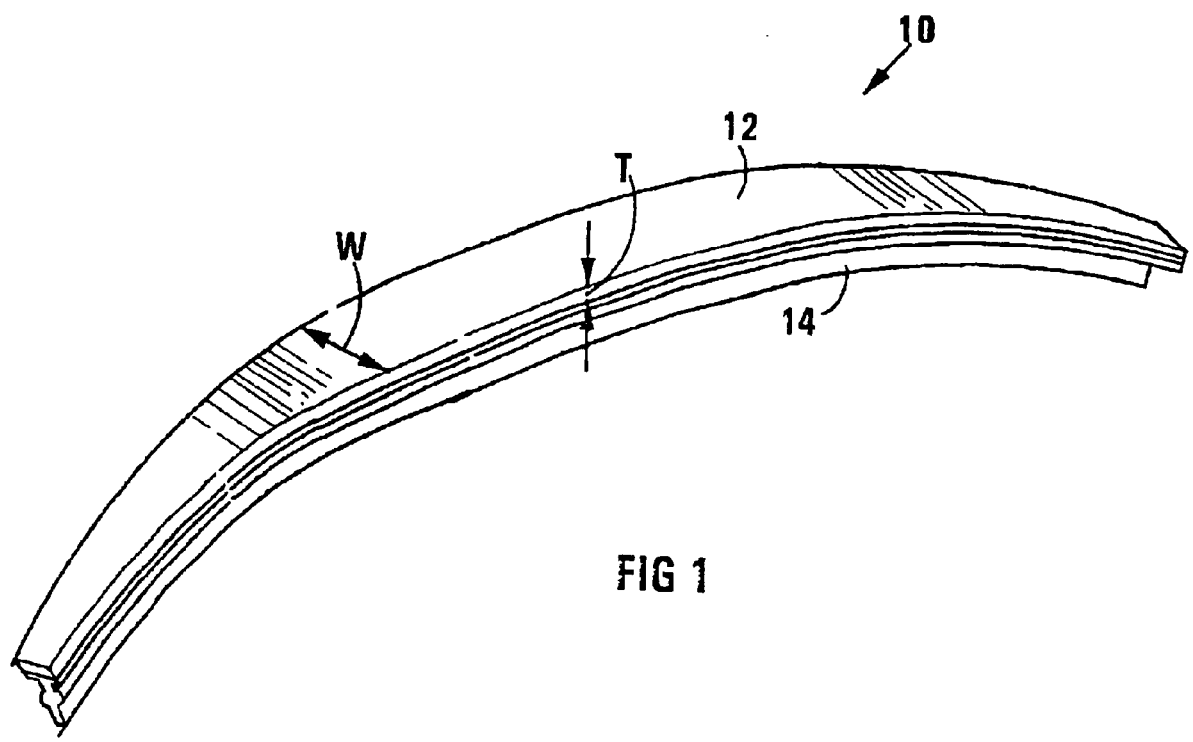
FIG. 1 shows a schematic perspective view from above of a windscreen wiper in accordance with the invention.
Figure 3:
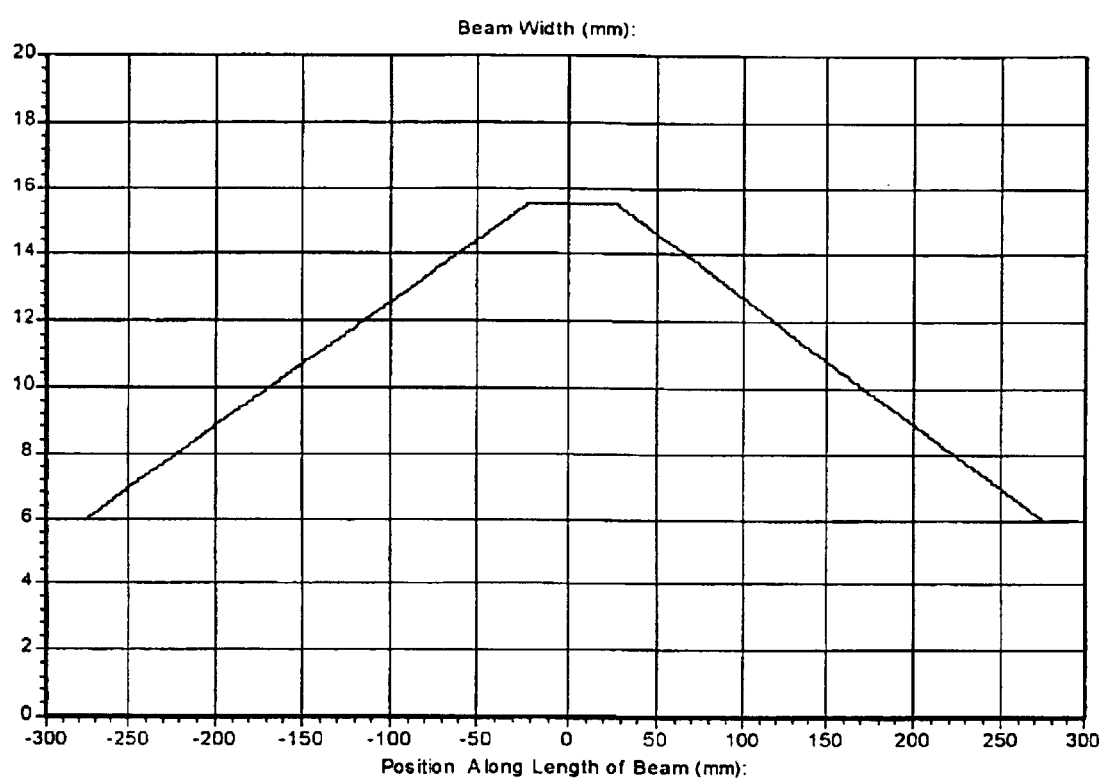
FIG. 3 shows a graph indicating the variation of width of the backbone of the windscreen wiper shown in FIGS. 1 and 2.
Figure 4:
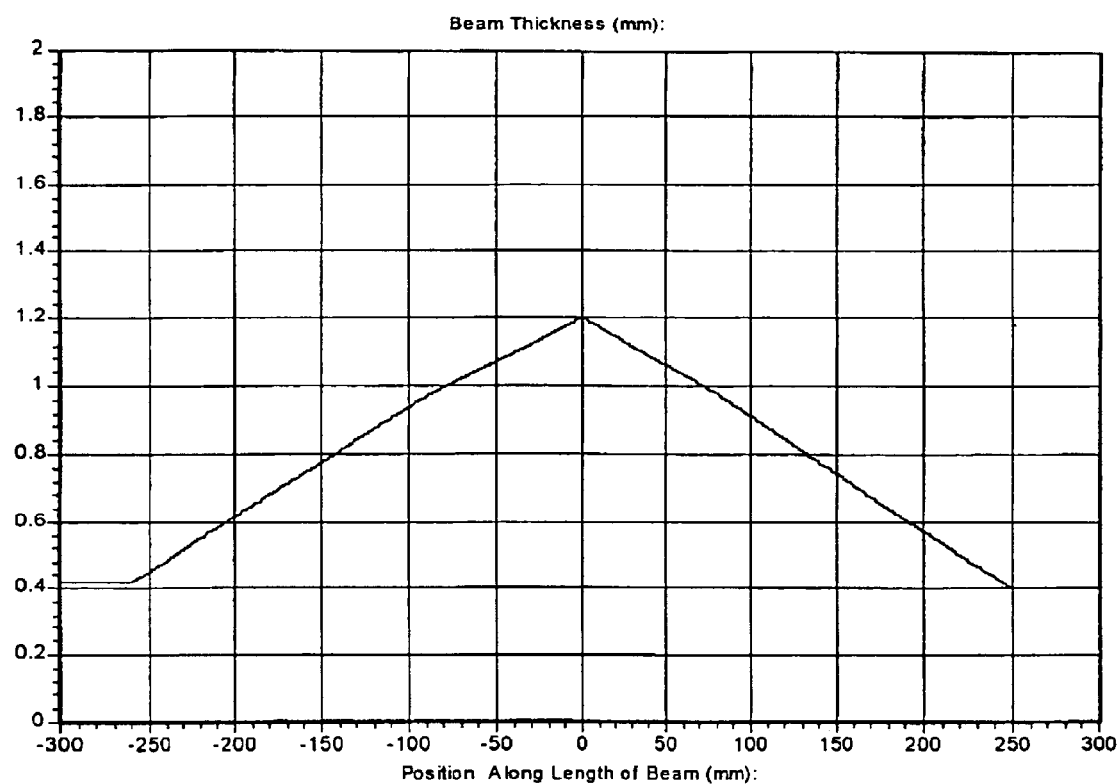
FIG. 4 shows a graph indicating the variation of thickness of the backbone of the windscreen wiper shown in FIGS. 1 and 2.

In the drawings, a windscreen wiper in accordance with the invention is generally designated by the reference numeral 10. The windscreen wiper 10 includes a backbone 12 which is in the form of a beam and a rubber wiper blade 14. The beam is made from spring steel having a Young's modulus of 200 GPa. The length of the beam is 600 mm. The beam has a rectangular cross-sectional profile at all points along its length. Thus, the beam has a width dimension W and a thickness dimension T as shown in FIG. 1. The beam tapers both in width and thickness from its centre toward its free ends or tips as shown in FIG. 3 and FIG. 4 respectively. FIG. 3 illustrates the beam width (in millimeters) at various positions along the length of the beam, which is also measured in millimeters. FIG. 4 illustrates the thickness of the beam (in millimeters) at various positions along the length of the beam which is also measured in millimeters.

Figure 2:
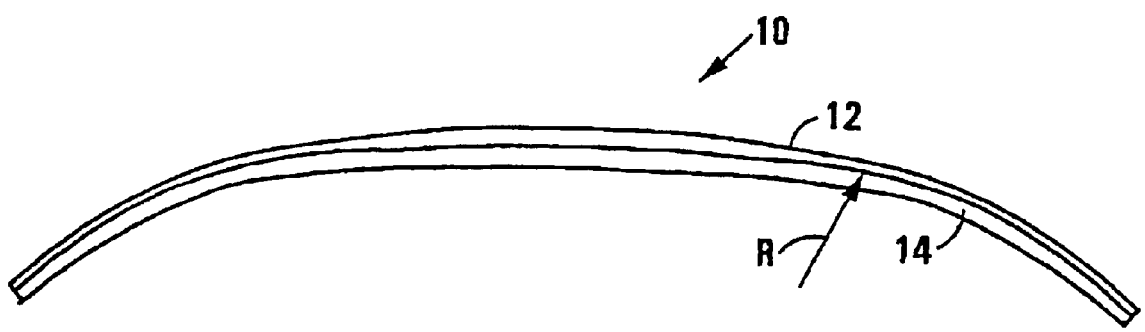
FIG. 2 shows a side view of the wiper of FIG. 1 in an unloaded free-form condition.
Figure 5:
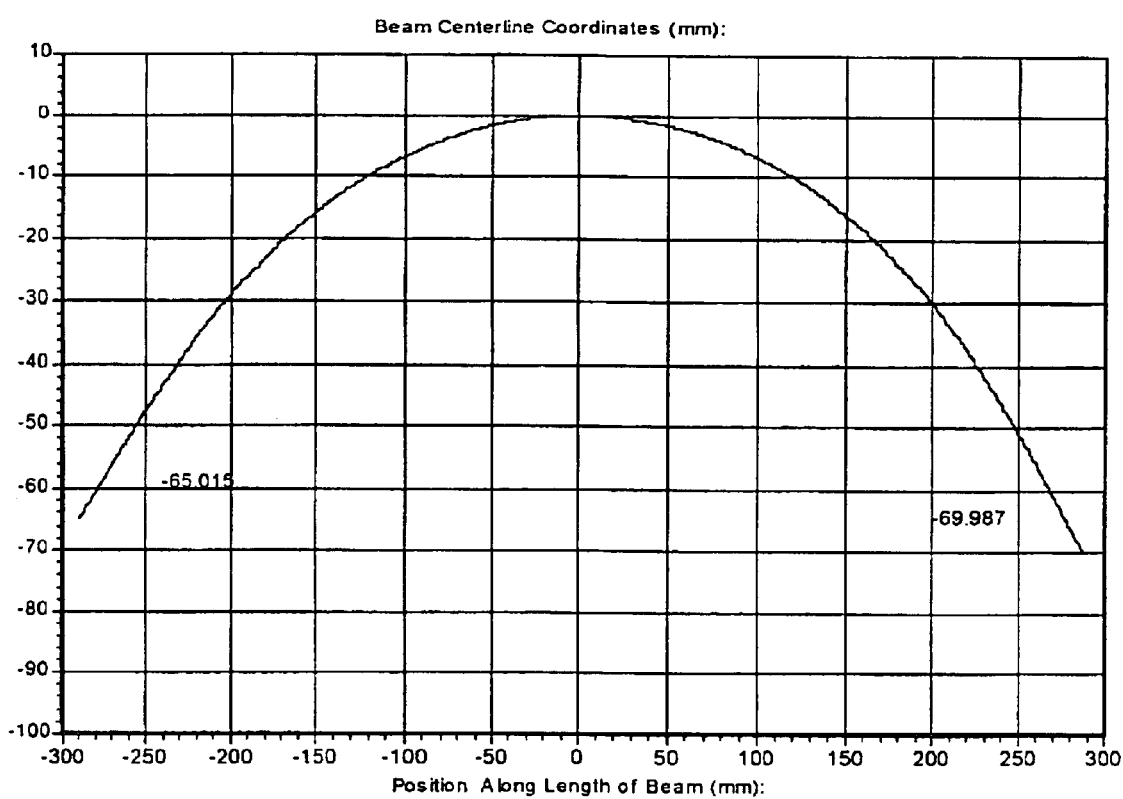
FIG. 5 shows a graph indicating the free-form co-ordinates of the centre line of the backbone of the windscreen wiper shown in FIGS. 1 and 2.

The beam is curved longitudinally, in a plane, with a predetermined radius of curvature R at every point along its length as shown in FIG. 2. FIG. 5 shows the beam centre line co-ordinates relative to the position along the length of the beam (in millimeters).

With the given formulas, it can be determined if the wiper, as described in the drawings conforms to the invention. The width of the beam 12 at its widest point along the beam 12, $W_m$ (expressed in millimeters) is 15.4 as shown in FIG. 3. According to the first aspect of the invention, the magnitude of the width at the widest point along the beam 12, $W_m$ (expressed in millimeters), where L is 600 mm and E is 200 GPa, should be less than $(-8.889 \cdot 10^{-5}*E+0.05378)*L-5.25 = (-8.889 \cdot 10^{-5}*200+0.05378)*600-5.25 = 16{,}35$ mm. The width $W_m$ of the wiper therefore falls within the scope of the invention.

The thickness of the beam 12 at the thickest point along the beam 12, $T_m$ (expressed in millimeters) is 1.2 mm as shown in FIG. 4. According to the second aspect of the invention the magnitude of the thickness at the thickest point along the beam 12, $T_m$ (expressed in millimeters), where L is 600 mm and E is 200 GPa, should be less than $0.0007*-0.0027407*E+1.37814 = 0.0007*600-0.0027407*200+1.37814 = 1{,}25$ mm. The thickness $T_m$ of the wiper therefore also falls with the scope of the invention.

What is claimed is:

1. A windscreen wiper (10) which includes
an elongate curved backbone (12) which is of a resiliently flexible material having a Young's modulus of between 50 GPa to 350 GPa, the backbone having a substantially spatially consolidated cross-sectional profile at substantially all points along its length,
characterized therein that the magnitude of the width at substantially the widest point along the backbone, Wm (expressed in millimeters) is at most $(-8.889*10-5*E0.05378)*L-5.25$, where L is the total length of the backbone expressed in millimeters and E is the Young's modulus of the backbone material expressed in GPa.

2. The windscreen wiper as claimed in claim 1, characterized therein that the material of the backbone is a composite material, with the Young's modulus being that of the composite material.

3. The windscreen wiper as claimed in claim 1, characterized therein that the backbone has a varying width and thickness along its length.

4. The windscreen wiper as claimed in claim 1, characterized therein that the backbone has a free form curvature in a plane.

5. The windscreen wiper as claimed in claim 1, characterized therein that the backbone has a compound curvature.

6. The windscreen wiper as claimed in claim 1, characterized therein that the backbone has a cross-sectional profile that is rectangular at substantially all points along its length.

7. A windscreen wiper (10) which includes
an elongate curved backbone (12) which is of a resiliently flexible material having a Young's modulus of between 50 GPa to 350 GPa, the backbone having a substantially spatially consolidated cross-sectional profile at substantially all points along its length,
characterized therein that the ratio of the magnitude of the width at the widest point along the backbone, to the total length L of the backbone, Rw is at most $(-8.889*10-5*E+0.05378)-5.25/L$, where L is the total length of the backbone expressed in millimeters and E is the Young's modulus of the backbone material expressed in GPa.

8. A windscreen wiper (10) which includes
an elongate curved backbone (12) which is of a resiliently flexible material having a Young's modulus of between 50 GPa to 350 GPa, the backbone having a substantially spatially consolidated cross-sectional profile at substantially all points along its length,
characterized therein that the magnitude of the thickness at substantially the thickest point along the backbone, Tm (expressed in millimeters) is at most $0.0007*L-0.0027407*E+1.37814$, where L is the total length of the backbone expressed in millimeters and E is the Young's modulus of the backbone material expressed in GPa.

9. The windscreen wiper as claimed in claim 8, characterized therein that the material of the backbone is a composite material, with the Young's modulus being that of the composite material.

10. The windscreen wiper as claimed in claim 8, characterized therein that the backbone has a varying width and thickness along its length.

11. The windscreen wiper as claimed in claim 8, characterized therein that the backbone has a free form curvature in a plane.

12. The windscreen wiper as claimed in claim 8, characterized therein that the backbone has a compound curvature.

13. The windscreen wiper as claimed in claim 8, characterized therein that the backbone has a cross-sectional profile that is rectangular at substantially all points along its length.

14. A windscreen wiper (10) which includes
an elongate curved backbone (12) which is of a resiliently flexible material having a Young's modulus of between 50 GPa to 350 GPa, the backbone having a substantially spatially consolidated cross-sectional profile at substantially all points along its length,
characterized therein that the ratio of the magnitude of the thickness at substantially the thickest point along the backbone, to the total length L of the backbone, Rt is at most $0.0007-(0.0027407*E-1.37814)/L$, where L is the total length of the backbone expressed in millimeters and E is the Young's modulus of the backbone material expressed in GPa.

15. A windscreen wiper (10) which includes
an elongate curved backbone (12) which is of a resiliently flexible material having a Young's modulus of between 50 GPa to 350 GPa, the backbone having a substantially spatially consolidated cross-sectional profile at substantially all points along its length,
characterized therein that the magnitude of the width at the widest point along the backbone, Wm (expressed in millimeters) is at most $(-8.889*10-5*E+0.05378)*L-5.25$, and the magnitude of the thickness at the thickest point along the backbone, Tm (expressed in millimeters) is at most $0.0007*L-0.0027407*E+1.37814$, where L is the total length of the backbone expressed in millimeters and E is the Young's modulus of the backbone material expressed in GPa.

* * * * *

UNITED STATES PATENT AND TRADEMARK OFFICE
CERTIFICATE OF CORRECTION

PATENT NO. : 6,836,925 B1
DATED : January 4, 2005
INVENTOR(S) : Swanepoel

It is certified that error appears in the above-identified patent and that said Letters Patent is hereby corrected as shown below:

Column 3,
Line 29, "substantially" should be removed.
Line 31, "5*E0.05378)*L-5.25" should read -- 5*E+0.05378)*L-5.25 --.

Column 4,
Lines 10 and 38, "substantially" should be removed.

Signed and Sealed this

Twenty-third Day of August, 2005

JON W. DUDAS
*Director of the United States Patent and Trademark Office*